United States Patent
Bardini et al.

(10) Patent No.: US 8,917,606 B2
(45) Date of Patent: *Dec. 23, 2014

(54) METHOD OF FLOW CONTROL FOR DATA TRANSPORTED USING ISOCHRONOUS PACKETS OVER AN IEEE 1394-2000 SERIAL BUS NETWORK

(75) Inventors: Richard A. Bardini, Los Gatos, CA (US); Glen Stone, Los Gatos, CA (US); Scott Smyers, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 443 days.

This patent is subject to a terminal disclaimer.

(21) Appl. No.: 13/045,337

(22) Filed: Mar. 10, 2011

(65) Prior Publication Data

US 2011/0158109 A1 Jun. 30, 2011

Related U.S. Application Data

(63) Continuation of application No. 10/091,638, filed on Mar. 5, 2002, now Pat. No. 7,929,447.

(51) Int. Cl.
| | |
|---|---|
| *G08C 15/00* | (2006.01) |
| *H04L 12/40* | (2006.01) |
| *H04L 12/801* | (2013.01) |
| *H04L 12/64* | (2006.01) |
| *H04L 12/851* | (2013.01) |
| *H04L 12/823* | (2013.01) |
| *H04L 12/825* | (2013.01) |

(52) U.S. Cl.
CPC .... *H04L 12/40058* (2013.01); *H04L 12/40117* (2013.01); *H04L 12/40071* (2013.01); *H04L 47/13* (2013.01); *H04L 12/6418* (2013.01); *H04L 47/10* (2013.01); *H04L 47/24* (2013.01); *H04L 47/32* (2013.01); *H04L 47/26* (2013.01)
USPC .......................................... 370/236; 370/231

(58) Field of Classification Search
CPC ................... H04L 12/40117; H04L 12/40071
USPC .......... 370/236, 347, 231, 322, 330; 348/569, 348/563; 455/450
See application file for complete search history.

(56) References Cited

U.S. PATENT DOCUMENTS

| | | | | |
|---|---|---|---|---|
| 6,560,200 | B1 * | 5/2003 | Shinozuka | 370/241 |
| 6,717,947 | B1 * | 4/2004 | Ghodrat et al. | 370/395.1 |
| 7,046,627 | B1 * | 5/2006 | Dejanovic et al. | 370/230 |

* cited by examiner

*Primary Examiner* — Chandrahas Patel
(74) *Attorney, Agent, or Firm* — Haverstock & Owens LLP

(57) ABSTRACT

An isochronous back channel is configured between a transmitting device and a receiving device. The isochronous back channel provides retransmission and flow control information from the receiving device to the transmitting device related to a stream of isochronous data packets transmitted from the transmitting device to the receiving device. An isochronous back channel packet for indicating a retransmission or flow control function to perform is configured and transmitted from the receiving device to the transmitting device over the isochronous back channel. A transmitting plug is configured on the receiving device and a receiving plug is configured on the transmitting device for implementing the isochronous back channel. The isochronous back channel packet includes a control instruction that instructs the transmitting device to either reset, stop or resume transmission of the stream of isochronous data packets being transmitted from the transmitting device to the receiving device.

42 Claims, 10 Drawing Sheets

| Address | Length, Bytes | Contents |||||||| 
|---|---|---|---|---|---|---|---|---|---|
| | | 7 | 6 | 5 | 4 | 3 | 2 | 1 | 0 |
| $0000_{16}$ | 2 | Compound_length |||||||| 
| $0001_{16}$ | | |||||||| 
| $0002_{16}$ | 2 | Info_block_type |||||||| 
| $0003_{16}$ | | |||||||| 
| $0004_{16}$ | 2 | Primary_fields_length |||||||| 
| $0005_{16}$ | | |||||||| 
| $0006_{16}$ | 2 | reserved |||| isochronous_channel_number ||||

METHOD OF FLOW CONTROL FOR DATA TRANSPORTED USING ISOCHRONOUS PACKETS OVER AN IEEE 1394-2000 SERIAL BUS NETWORK

RELATED APPLICATIONS:

This application is a continuation of co-pending U.S. patent application Ser. No. 10/091,638, filed on Mar. 5, 2002, titled, "A METHOD OF FLOW CONTROL FOR DATA TRANSPORTED USING ISOCHRONOUS PACKETS OVER AN IEEE 1394-2000 SERIAL BUS NETWORK." The U.S. patent application Ser. No. 10/091,638, filed on Mar. 5, 2002, titled, "A METHOD OF FLOW CONTROL FOR DATA TRANSPORTED USING ISOCHRONOUS PACKETS OVER AN IEEE 1394-2000 SERIAL BUS NETWORK" is also hereby incorporated by reference.

FIELD OF THE INVENTION

The present invention relates to the field of transmitting data using isochronous data packets. More particularly, the present invention relates to the field of performing retransmission and flow control on data transmitted using isochronous data packets.

BACKGROUND OF THE INVENTION

A standard adopted by the Institute for Electrical and Electronics Engineers (IEEE), "IEEE 1394-2000 Standard For A High Performance Serial Bus," is an international standard for implementing an economical high-speed serial bus architecture. This standard provides a universal input/output connection for interconnecting digital devices including, for example, audio-visual equipment and personal computers.

The IEEE 1394-2000 standard supports both asynchronous and isochronous format data transfers. Asynchronous transfers are data transfer operations which transfer data from a source node to a destination node and take place as soon as permitted after initiation. An example of an application appropriate for asynchronous data transfer is communication of a still image or text document. Control commands can also be sent asynchronously.

Isochronous data transfers are real-time data transfers which take place such that time intervals between significant instances have the same duration at both the transmitting and receiving applications. An example of an application suitable for the transfer of data isochronously is the transfer of audio-visual data (AV data) between devices, such as a video camera and a television set. The video camera records sounds and images (AV data) and stores the data in discrete segments on tape. The data payload included in each packet represents the image and/or sound recorded over a limited period of time. The video camera then transfers each segment in a packetized manner during an appropriate interval for reproduction by the television set. In this manner, a transmitted sequence of related isochronous data packets constitutes an AV program, such as a television program or a motion picture.

The IEEE 1394-2000 standard bus architecture provides multiple channels for isochronous data communication between applications. A six-bit channel number is broadcast with the data to allow reception by the appropriate application. This allows multiple applications to concurrently communicate isochronous data across the bus structure without interfering with each other.

The cable required by the IEEE 1394-2000 standard is relatively thin in size compared to other bulkier cables used to connect such devices. The IEEE 1394-2000 cable environment is a network of nodes connected by point-to-point links, each link including a port for each node's physical connection and the cable between them. The physical topology for the cable environment of an IEEE 1394-2000 serial bus is a non-cyclic network of multiple ports, with finite branches. A primary restriction on the cable environment is that nodes must be connected together without forming any closed loops.

Devices can be added and removed from an IEEE 1394-2000 bus while the bus is active. If a device is so added or removed, the bus automatically reconfigures itself for transmitting data between the then existing nodes. A node is considered a logical entity with a unique address on the bus structure. Each node provides an identification ROM, a standardized set of control registers and its own address space.

The IEEE 1394-2000 cables connect ports together on different nodes. Each port includes terminators, transceivers and logic. A node can have multiple ports at its physical connection. The cable and ports act as bus repeaters between the nodes to simulate a single logical bus. The cable physical connection at each node includes one or more ports, arbitration logic, a resynchronizer and an encoder. Each of the ports provide the cable media interface into which the cable connector is connected. The arbitration logic provides access to the bus for the node. The resynchronizer takes received data-strobe encoded data bits and generates data bits synchronized to a local clock for use by the applications within the node. The encoder takes either data being transmitted by the node or data received by the resynchronizer, which is addressed to another node, and encodes it in data-strobe format for transmission across the IEEE 1394-2000 serial bus. Using these components, the cable physical connection translates the physical point-to-point topology of the cable environment into a virtual broadcast bus, which is expected by higher layers of the system. This is accomplished by taking all data received on one port of the physical connection, resynchronizing the data to a local clock and repeating the data out of all of the other ports from the physical connection.

The IEEE 1394-2000 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394-2000 cable. The physical layer 16 also provides arbitration to ensure that all devices coupled to the IEEE 1394-2000 bus have access to the bus as well as actual data transmission and reception. The link layer 14 provides data packet delivery service for both asynchronous and isochronous data packet transport. This supports both asynchronous data transport, using an acknowledgment protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

The IEEE 1394-2000 standard defines a structured packet into which information is encapsulated for isochronous transfer upon the bus. Each isochronous data packet includes at least an IEEE 1394-2000 packet header. The packet header includes overhead information necessary for proper communication of the packet. Typically, content data, such as audiovisual data, is included in the packet, in a data field following the packet header. When an isochronous data packet is received, the receiving device must generally separate the header information from the content data so that the content data can be appropriately processed, such as for display. In addition, due to timing considerations, isochronous packets which include only header information and no content data portion are occasionally communicated via an IEEE 1394-2000 bus.

IEEE 1394-2000 isochronous data packets are transmitted over isochronous channels using isochronous arbitration or over asynchronous streams using asynchronous arbitration. Transmitting over isochronous channels, an isochronous data packet is transmitted only during the isochronous period. The isochronous period is controlled by the cycle master, which signals the start of the period with a cycle start packet. The period ends when a subaction gap is observed, which happens after all isochronous transmitters have had a chance to transmit. Two resources, bandwidth and channel number, are allocated from the isochronous resource manager registers BANDWIDTH_AVAILABLE and CHANNELS_AVAILABLE, respectively. For a given channel number, no more than one transmitter can transmit an isochronous data packet with that channel number each isochronous period.

Using asynchronous streams, some of the aforementioned requirements related to transmitting isochronous data packets over isochronous channels are relaxed. Transmitting over asynchronous streams, an isochronous data packet is transmitted during the asynchronous period, subject to the same arbitration requirements as other request subactions. The channel number is allocated from the isochronous resource manager register CHANNELS_AVAILABLE. Multiple nodes can transmit isochronous data packets with the same channel number or the same node can transmit multiple isochronous data packets with the same channel number as often as desired, subject to arbitration fairness.

The IEEE 1394-2000 standard does not specify particular formats for the content data of the data field. Rather, the organization of content data in accordance with a particular format and the interpretation of data field contents are functions of the transmitting and receiving applications, respectively. In order to facilitate interoperability between a wide range of digital devices, data fields should encapsulate data in accordance with a standardized format. One such format that has gained wide acceptance is the Common Isochronous Protocol (CIP). The data field may contain a header and audio-visual content data, as when the CIP Transport Protocol is used. This header within the data field is the CIP header. For CIP transport, some data fields contain only the CIP header. This use of a header and data protocol within the data field is referred to as an Isochronous Transport Protocol. A receiver of such isochronous packets cannot necessarily predict when a packet will not include a content data portion until after the IEEE 1394-2000 header information is received.

The AV/C Digital Interface Command Set is a command set used for transactions between consumer audio/video equipment over an IEEE 1394-2000 serial bus. This AV/C command set makes use of the Function Control Protocol (FCP) defined by IEC-61883, the ratified international standard for the transport of audio/video command requests and responses. Neither the IEEE 1394-2000 serial bus nor the AV/C Command Set provide a master-slave relationship between the devices coupled within the IEEE 1394-2000 serial bus network. Instead, both the IEEE 1394-2000 serial bus and the AV/C Command Set operate based on the cooperative peer-to-peer coexistence of devices within the network.

IEC-61883 is a ratified international standard for the transport of audio/video command requests and responses. This standard uses the concept of plugs and plug control registers to manage and control the attributes of isochronous data flows. It should be noted that plugs do not physically exist on an audio/video device, but a plug is used to establish an analogy with existing audio/video devices where each flow of information is routed through a physical plug.

An isochronous data flow is sent from one transmitting device to one or more receiving devices by transmitting isochronous packets on an isochronous channel of the IEEE 1394-2000 serial bus. Each isochronous data flow is transmitted to an isochronous channel through one output plug on the transmitting device and is received from that isochronous channel through one input plug on the receiving device.

The transmission of an isochronous data flow through an output plug is reflected by data in an output plug control register (oPCR) and an output master plug register (oMPR) located on the transmitting device. The output master plug register contains all attributes that are common to all isochronous data flows transmitted by the corresponding transmitting device. The output plug control register contains all attributes of the corresponding isochronous data flow that are independent from attributes of other isochronous data flows transmitted by the transmitting device.

The reception of an isochronous data flow through an input plug is reflected by an input plug control register (iPCR) and an input master plug register (iMPR) located on the receiving device. The input master plug register contains all attributes that are common to all isochronous data flows received by the receiving device. The input plug control register contains all attributes of the corresponding isochronous data flow that are independent from attributes of other isochronous data flows received by the receiving device.

An isochronous data flow can be controlled by any device connected to the IEEE 1394-2000 bus by modifying the corresponding plug control registers and by initiating or connecting to an existing transmission. Plug control registers can be modified through asynchronous transactions on the IEEE 1394-2000 bus or by internal modifications if the plug control registers are located on the controlling device.

To transport isochronous data between two audio/video devices on the IEEE 1394-2000 bus, it is necessary for an application to virtually connect an output plug on the transmitting device to an input plug on the receiving device using an isochronous channel. The relationship between one input plug, one output plug and one isochronous channel is called a point-to-point connection. A point-to-point connection can only be broken by the application that established it. An application can also just start the transmission or reception of an isochronous data flow on its own device by connecting one of its output or input plugs respectively to an isochronous channel. The relationship between one output plug and one isochronous channel is called a broadcast-out connection. The relationship between one input plug and one isochronous channel is called a broadcast-in connection. Broadcast-out and broadcast-in connections are collectively called broadcast connections. A broadcast connection can be established only by the device on which the plug is located, but it can be broken by any device.

5C Digital Transmission Content Protection (DTCP) defines a cryptographic protocol for protecting audio/video (AN) content from unauthorized copying, intercepting, and tampering as it traverses digital transmission mechanisms such as a high-performance serial bus that conforms to the IEEE 1394-2000 standard. Only legitimate A/V content delivered to a source device via another approved copy protection system, such as the DVD Content Scrambling System, will be protected by this copy protection system. A Digital Transmission Licensing Administrator (DTLA) is responsible for establishing and administering the content protection system described in the 5C DTCP specification. According to the 5C DTCP DTLA licensing rules, encrypted audio/video digital content cannot be transmitted using asynchronous block data transfers. However, isochronous packets do adhere to 5C DTCP DTLA licensing rules for transmitting, and receiving encrypted audio/video digital content.

Conventional systems can transmit digital content by using IEEE 1394-2000 asynchronous data packet transfers or by using IEEE 1394-2000 isochronous packets over isochronous channels or over asynchronous streams. Asynchronous data packet transfers are inherently reliable, as the asynchronous data packet format provides for transmission failure detection and retransmission capabilities. Additionally, data transfers using asynchronous data packets can be held off easily by the receiving device, when necessary, because of device throughput limitations. Most conventional systems transmit content in non real-time using asynchronous data packets. However, asynchronous data packet transfer rates cannot be guaranteed. Therefore, when trying to perform faster than real-time digital content transfers on a bus with other data transfers occurring simultaneously, the necessary bandwidth may not be available.

Further, transmission of asynchronous data packets can not enforce 5C copy protection of the data being transmitted. In order to enforce 5C copy protection, isochronous data packets must be used. However, isochronous data packets inherently do not provide a method for indicating packet transmission errors to the transmitting device. Further, data transfers using isochronous data packets do not provide a method for the receiving device to hold off transmission from the transmitting device because of throughput limitations at the receiving device.

SUMMARY OF THE INVENTION

A data transmission method of the present invention applies retransmission and flow control capabilities to a transmission of isochronous data packets. The method of performing retransmission and flow control configures an isochronous back channel between a transmitting device and a receiving device. The isochronous back channel provides retransmission and flow control information from the receiving device to the transmitting device related to a stream of isochronous data packets transmitted from the transmitting device to the receiving device. Preferably, the stream of isochronous data packets is transmitted in non real-time. The retransmission and flow control information is provided by monitoring the stream of isochronous data packets received at the receiving device for necessary retransmission and flow control. An isochronous back channel packet for indicating a retransmission or flow control function to perform is configured and transmitted from the receiving device to the transmitting device over the isochronous back channel. A transmitting plug is configured on the receiving device for transmitting the isochronous back channel packet over the isochronous back channel. A receiving plug is configured on the transmitting device for receiving the isochronous back channel packet over the isochronous back channel.

The isochronous back channel packet includes a control instruction that instructs the transmitting device to either reset, stop or resume transmission of the stream of isochronous data packets being transmitted from the transmitting device to the receiving device. The isochronous back channel packet also includes a dbc value that identifies a specific packet within the stream of isochronous data packets to which the reset or resume control instruction is to be applied.

The transmitting device regulates data transmission based on the flow control and retransmission information included within the isochronous back channel packet. The flow control and retransmission information included within the isochronous back channel packet includes identification of a specific stream of isochronous data packets, a control instruction, and identification of a specific packet within the identified stream of isochronous data packets to which the control instruction is to be applied The receiving plug and the transmitting plug are preferably configured by embedding a back channel flow control information block within a plug configuration block. The back channel flow control information block includes a back channel information type that indicates an isochronous back channel control mechanism for providing flow control and retransmission control instructions. The back channel flow control information block also includes an isochronous channel number field used that indicates the isochronous channel used to send the isochronous back channel packet.

In one aspect of the present invention, a method of performing retransmission and flow control including configuring a back channel between a transmitting device and a receiving device for providing retransmission and flow control information from the receiving device to the transmitting device related to a stream of isochronous data packets transmitted from the transmitting device to the source device, monitoring the stream of isochronous data packets received at the receiving device for necessary retransmission or flow control, configuring an back channel packet for indicating a retransmission or flow control function to perform, and transmitting the back channel packet from the receiving device to the transmitting device over the back channel. Configuring the back channel includes configuring a transmitting plug on the receiving device for transmitting the back channel packet over the back channel and configuring a receiving plug on the transmitting device for receiving the back channel packet over the back channel. The stream of isochronous data packets is transmitted in non real-time. The back channel packet includes a control instruction that instructs the transmitting device to reset transmission of the stream of isochronous data packets starting from a specified packet within the stream of isochronous data packets. The back channel packet includes a dbc field that identifies the specific packet within the stream of isochronous data packets. The back channel packet includes a control field that contains a value corresponding to the control instruction. The back channel packet includes a control instruction that instructs the transmitting device to stop transmitting the stream of isochronous data packets. The stream of isochronous data packets includes audio/visual content data. The back channel packet is an isochronous data packet. The back channel packet is an asynchronous data packet. The back channel is an isochronous channel.

In another aspect of the present invention, a method of performing retransmission and flow control includes configuring an isochronous channel between a transmitting device and a receiving device as an isochronous back channel for providing retransmission and flow control information from the receiving device to the transmitting device related to a stream of isochronous data packets transmitted from the transmitting device to the source device, monitoring the stream of isochronous data packets received at the receiving device for necessary retransmission or flow control, configuring an isochronous back channel packet for indicating a retransmission or flow control function to perform, and transmitting the isochronous back channel packet from the receiving device to the transmitting device over the isochronous back channel. Configuring the isochronous channel includes configuring a transmitting plug on the receiving device for transmitting the isochronous back channel packet over the isochronous back channel and configuring a receiving plug on the transmitting device for receiving the isochronous back channel packet over the isochronous back channel. The stream of isochronous data packets is transmitted in non real-time. The isochronous back channel packet includes a control instruction that instructs the transmitting device to reset transmission of the stream of isochronous data packets starting from a specified packet within the stream of isochronous data packets. The isochronous back channel packet includes a dbc field that identifies the specific packet within the stream of isochronous data packets. The isochronous back channel packet includes a control field that contains a value corresponding to the control instruction. The isochronous back channel packet includes a control instruction that instructs the transmitting device to stop transmitting the stream of isochronous data packets. The stream of isochronous data packets includes audio/visual content data.

In yet another aspect of the present invention, a method of transmitting flow control and retransmission information includes configuring a transmitting plug on a receiving device for transmitting an isochronous back channel packet over an isochronous channel via the transmitting plug to a transmitting device, determining flow control and retransmission information based on the status of a received isochronous data packet at the receiving device, wherein the received isochronous data packet is one of a stream of isochronous data packets transmitted from the transmitting device to the receiving device, packetizing flow control and retransmission information within the isochronous back channel packet, and transmitting the isochronous back channel. packet from the receiving device over the isochronous back channel via the transmitting plug. The stream of isochronous data packets is transmitted in non real-time. The status of the received isochronous data packet indicates a packet transmission error and instructs the transmitting device to reset transmission of the stream of isochronous data packets starting from a specified packet within the stream of isochronous data packets. The status of the received isochronous data packet indicates that the receiving device is not capable of receiving the stream of isochronous data packets and instructs the transmitting device to stop transmitting the stream of isochronous data packets. The status of the received isochronous data packet indicates that the receiving device is capable of resuming reception of the stream of isochronous data packets and instructs the transmitting device to restart transmission of the stream of isochronous data packets starting from a specified packet within the stream of isochronous data packets.

In still yet another aspect of the present invention, a method of receiving flow control and retransmission information includes configuring a receiving plug on a transmitting device for receiving an isochronous back channel packet from a receiving device, wherein the isochronous back channel packet is received over an isochronous channel via the receiving plug, receiving the isochronous back channel packet via the receiving plug, reading flow control and retransmission information included within the isochronous back channel packet wherein the flow control and retransmission information relates to a stream of isochronous data packets transmitted from the transmitting device to the receiving device and provides a control instruction to the transmitting device to regulate transmission of the stream of isochronous data packets, and regulating transmission of the stream of isochronous data packets as determined by the control instruction. The isochronous back channel packet includes identification of the stream of isochronous data packets, a control field that contains a value corresponding to the control instruction, and identification of a specific packet within the stream of isochronous data packets to which the control instruction is to be applied. The control instruction instructs the transmitting device to reset transmission of the stream of isochronous data packets starting from a specified packet within the stream of isochronous data packets. The control instruction instructs the transmitting device to stop transmitting the stream of isochronous data packets. The stream of isochronous data packets is transmitted in non real-time.

In yet another aspect of the present invention, a method of configuring a plug to support an isochronous back channel includes embedding a back channel flow control information block within a plug configuration information block, defining a back channel information type within the back channel flow control information block, wherein the back channel information type indicates an isochronous back channel control mechanism for providing a flow control and retransmission control instruction, and setting an isochronous channel number field within the back channel flow control information block to indicate the isochronous channel used to send an isochronous back channel packet, wherein the isochronous back channel packet includes the control instruction which is used to regulate a transmission of a stream of isochronous data packets. The back channel flow control information block is embedded within a non real-time plug transfer information block which is embedded within the plug configuration information block.

In another aspect of the present invention, an apparatus for communicating flow control and retransmission information includes a configuring circuit to configure a plug to communicate an isochronous back channel packet over an isochronous back channel, a packetizing circuit to packetize flow control and retransmission information within the isochronous back channel packet, a transceiver circuit configured to communicate the isochronous back channel packet via the plug, a de-packetizing circuit to extract the flow control and retransmission information from the isochronous back channel packet, and a controller coupled to the configuring circuit, the packetizing circuit, the transceiver circuit, and the de-packetizing circuit to determine a control instruction and a stream of isochronous data packets to which the control instruction is applied from the flow control and retransmission information and apply the control instruction to the determined stream of isochronous data packets. The stream of isochronous data packets is transmitted in non real-time. The control instruction is an indication to reset transmission of the stream of isochronous data packets starting from a specified packet within the stream of isochronous data packets. The isochronous back channel packet includes a dbc field that identifies the specific packet within the stream of isochronous data packets. The isochronous back channel packet includes a control field that contains a value corresponding to the control instruction. The control instruction is an indication to stop transmitting the stream of isochronous data packets. The stream of isochronous data packets includes audio/visual content data. The transceiver circuit is configured to transmit isochronous data packets in non real-time via the plug. The transceiver circuit is configured to receive isochronous data packets in non real-time via the plug.

DETAILED DESCRIPTION OF THE PREFERRED EMBODIMENT

A data transmission method of the present invention provides retransmission and flow control of transmitted isochronous data packets. Preferably, flow control and retransmission is applied to the delivery of audio/video (A/V) digital content as isochronous data packets transmitted in non real-time. Alternatively, flow control and retransmission is applied to any transmission of isochronous data packets. To provide the desired flow control and retransmission functionality, the data transmission method of the present invention must first provide a method of transmitting isochronous data packets in non real-time. A preferred method of transmitting isochronous data packets in non real-time is described in U.S. application Ser. No. 10/091,636, filed on Mar. 5, 2002, and entitled "A METHOD OF ANY SPEED DUBBING USING ISOCHRONOUS PACKETS ON ISOCHRONOUS CHANNELS OR ON ASYNCHRONOUS STREAMS OVER AN IEEE 1394-2000 SERIAL BUS NETWORK", and is hereby incorporated by reference.

It is important that the A/V digital content is packetized as isochronous data packets, and not asynchronous data packets, since isochronous data packets adhere to 5C DTCP DTLA rules for transmitting and receiving encrypted A/V digital content. According to 5C DTCP DTLA licensing rules, encrypted A/V digital data cannot be transmitted using asynchronous data packets. Non real-time transmission can be either faster than real-time, such as dubbing digital audio content, or slower then real-time, such as recording A/V content during non peak hours for later viewing but requiring lower bandwidth to transmit the data. Preferably, data transmission is over an IEEE 1394-2000 serial bus. Slower than real-time transfers are preferably performed using isochronous data packets over isochronous channels according to IEEE 1394-2000 isochronous arbitration. Alternatively, slower than real-time transfers are performed using isochronous data packets over asynchronous streams according to IEEE 1394-2000 asynchronous arbitration. Asynchronous transmission does not guarantee available bandwidth as transmission is subject to available time slots within the asynchronous cycle. Therefore, faster than real-time transfers are preferably performed using isochronous data packets over isochronous channels. Faster than real-time transfers preferably utilize reserved bandwidth which is reserved prior to transmission by the Isochronous Resource Manager (IRM). By reserving bandwidth, the speed of transmission is guaranteed.

Figure 1:
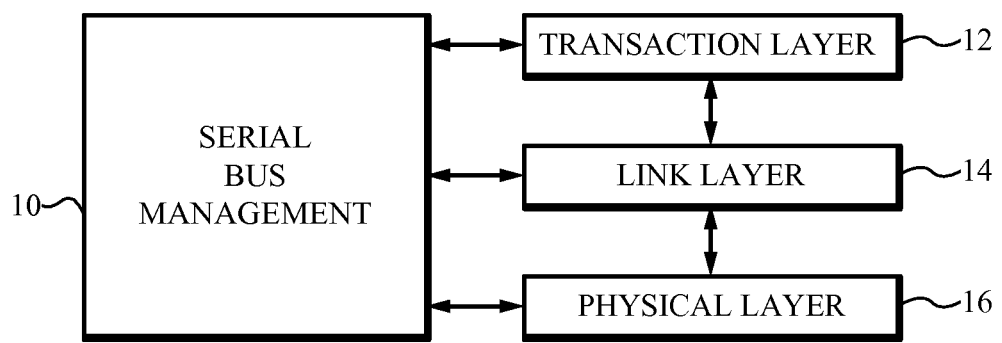
FIG. 1 illustrates a protocol defined by the IEEE 1394-2000 standard.
Figure 2:
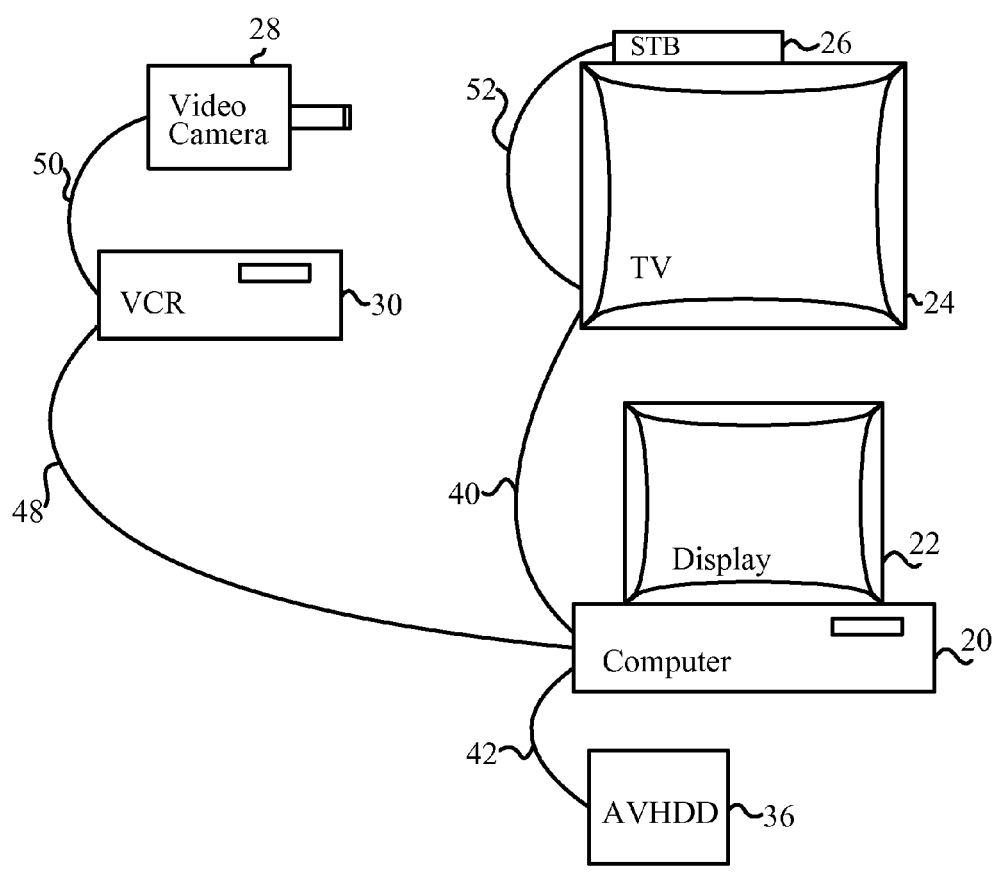
FIG. 2 illustrates an exemplary IEEE 1394-2000 serial bus network of devices including a video camera, a video cassette recorder, a set-top box, a television, a computer and an audio/video hard disk drive.

Preferably, A/V digital data is packetized as isochronous data packets and communicated in non real-time between AV/C compliant devices residing within an IEEE 1394-2000 serial bus network. FIG. 2 illustrates an exemplary network of devices including a video camera 28, a video cassette recorder (VCR) 30, a settop box 26, a television 24, a computer 20 and an audio/video hard disk drive (AVHDD) 36 coupled together by IEEE 1394-2000 cables 40, 42, 48, 50 and 52. The IEEE 1394-2000 cable 50 couples the video camera 28 to the VCR 30, allowing the video camera 28 to send data, commands and parameters to the VCR 30 for recording. The IEEE 1394-2000 cable 48 couples the VCR 30 to the computer 20. The IEEE 1394-2000 cable 42 couples the computer 20 to the AVHDD 36. The IEEE 1394-2000 cable 40 couples the computer 20 to the television 24. The IEEE 1394-2000 cable 52 couples the television 24 to the settop box 26.

The configuration illustrated in FIG. 2 is exemplary only. It should be apparent that an audio/video network could include many different combinations of components. The devices within such an IEEE 1394-2000 network are autonomous devices, meaning that in an IEEE 1394-2000 network, as the one illustrated in FIG. 2, in which a computer is one of the devices, there is not a true "master-slave" relationship between the computer and the other devices. In many IEEE 1394-2000 network configurations, a computer may not be present. Even in such configurations, the devices within the network are fully capable of interacting with each other on a peer basis. It should be recognized that data, commands and parameters can be sent between all of the devices within the IEEE 1394-2000 network, as appropriate.

Figure 3:
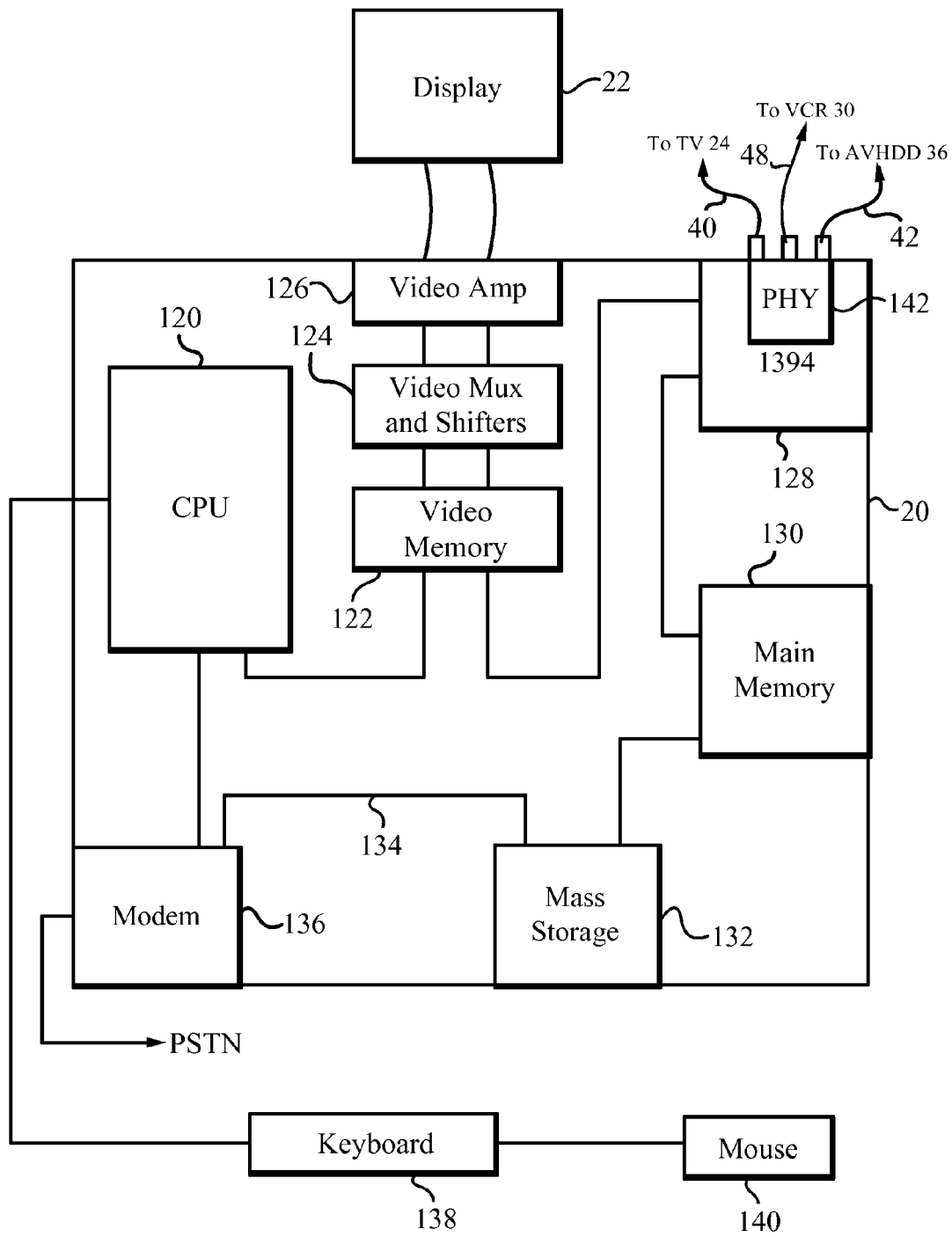
FIG. 3 illustrates an exemplary block diagram of the internal components of the computer 20.

A block diagram of the internal components of the computer system 20 is illustrated in FIG. 3. Within the drawings, the same elements as to FIGS. 1-9 are labeled with the same numbers. The computer system 20 includes a central processor unit (CPU) 120, a main memory 130, a video memory 122, a mass storage device 132, a modem 136, and an IEEE 1394-2000 interface circuit 128, all coupled together by a conventional bidirectional system bus 134. The modem 136 is preferably coupled to the public switched telephone network (PSTN) for sending and receiving communications. The interface circuit 128 includes the physical interface circuit 142 for sending and receiving communications on the IEEE 1394-2000 serial bus network. The physical interface circuit 142 is coupled to the television 24, to the VCR 30, and to the AVHDD 36 over the IEEE 1394-2000 serial bus cables 40, 48, and 42, respectively. In the preferred embodiment of the present invention, the interface circuit 128 is implemented on an IEEE 1394-2000 interface card within the computer system 20. However, it should be apparent to those skilled in the art that the interface circuit 128 can be implemented within the computer system 20 in any other appropriate manner, including building the interface circuit onto the motherboard itself. The mass storage device 132 may include both fixed and removable media using any one or more of magnetic, optical or magneto-optical storage technology or any other available mass storage technology. The system bus 134 contains an address bus for addressing any portion of the memory 122 and 130. The system bus 134 also includes a data bus for transferring data between and among the CPU 120, the main memory 130, the video memory 122, the mass storage device 132, the modem 136, and the interface circuit 128.

The computer system 20 is also coupled to a number of peripheral input and output devices including the keyboard 138, the mouse 140 and the associated display 22. The keyboard 138 is coupled to the CPU 120 for allowing a user to input data and control commands into the computer system 20. A conventional mouse 140 is coupled to the keyboard 138 for manipulating graphic images on the display 22 as a cursor control device. As discussed above, a user can utilize the computer system 20 to initiate a transaction with a content provider.

A port of the video memory 122 is coupled to a video multiplex and shifter circuit 124, which in turn is coupled to a video amplifier 126. The video amplifier 126 drives the display 22. The video multiplex and shifter circuitry 124 and the video amplifier 126 convert pixel data stored in the video memory 122 to raster signals suitable for use by the display 22.

Two problems exist in transmitting isochronous data packets in non real-time. The first problem is configuring an AV/C source plug and an AV/C destination plug to support non real-time streams. The second problem is packetizing the A/V digital content for transmission in non real-time. The data transmission method of the present invention preferably works within the context of the AV/C and IEC 61883 Standards to provide solutions to these two problems.

Within the framework of existing AV/C standards, information blocks are used to provide information to the AV/C devices. Information blocks are data structures. The information blocks are created in real-time during execution within the local memory. Specifically, there is provided within the AV/C standard a plug configuration information block for configuring an AV/C device plug for real-time transmission of isochronous data packets over an isochronous channel. The code for this existing plug configuration information block is 88 07$_{16}$. For communications between a host controller AV/C device and a target AV/C device, information blocks are the mechanism by which information is conveyed between the two. The longevity of each information block typically corresponds to how long the plug is active within the context of the current plug configuration information block. Embedded within the plug configuration information block are other information blocks including an information block that provides the type of data that is to be transmitted over the plug, for example Digital Video (DV), MPEG, or Audio type data. The AV/C standards discourage modifying existing information blocks. If additional information is to be provided, the AV/C standard provides means for adding new information blocks by which the additional information is to be provided.

The data transmission method of the preferred embodiment of the present invention creates a new information block embedded within the plug configuration information block (88 07$_{16}$). This new information block defines the non real-time properties to configure the plug for non real-time A/V digital content transmission/reception. The new information block includes an enable field for non real-time stream transfer and information on bus bandwidth, which is related to the non real-time transfer speed, to be used for the transfer. This new embedded information block fits within the guidelines of the AV/C working group for adding device subunit enhancements. The absence of this new information block within the plug configuration information block indicates real-time A/V content transmission/reception.

Figure 4:
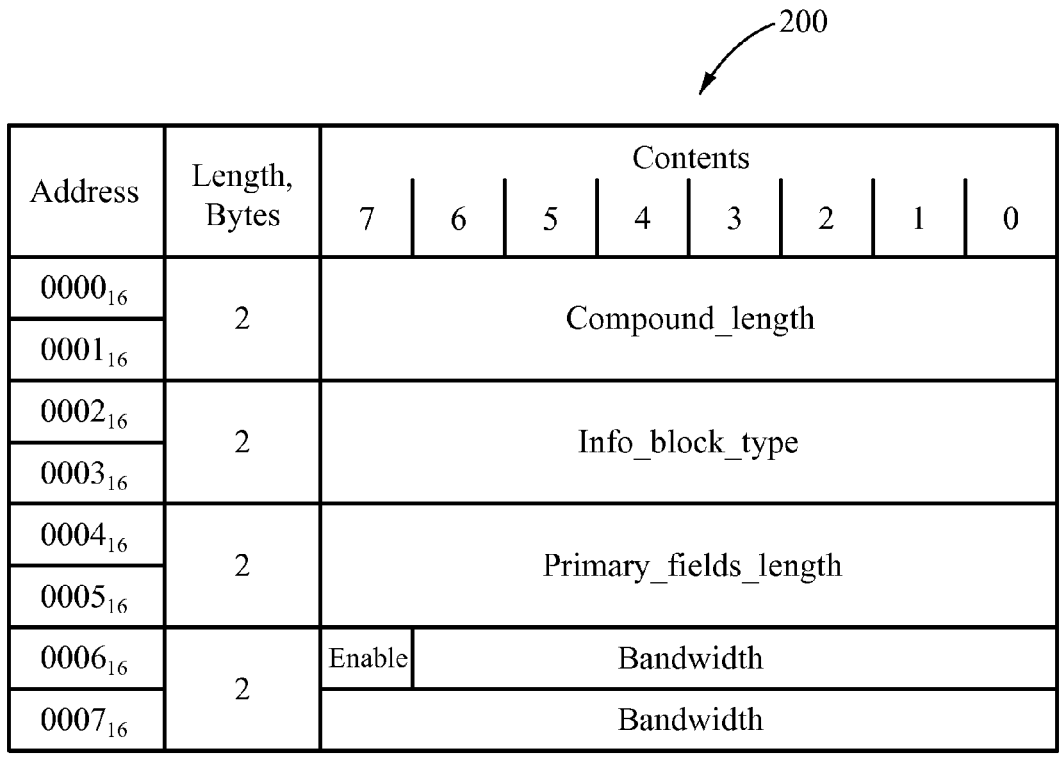
FIG. 4 illustrates a non real-time plug transfer information block according to the preferred embodiment of the present invention.

The new information block embedded within the existing plug configuration information block is referred to as a non real-time plug transfer information block. The non real-time plug transfer information block is illustrated in FIG. 4. A non real-time plug transfer information block 200 includes a compound_length field, an info_block_type field, a primary_fields_length field, an enable field, and a bandwidth field. The bit format of each field is determined by the AV/C standard. The compound_length field specifies the number of bytes for the remainder of the non real-time plug transfer information block 200, which is all fields that follow the compound_length field. The info_block_type field is set to a code indicating that the non real-time plug transfer information block 200 describes the plug's non real-time parameters. The primary_fields_length field specifies the number of bytes for the remaining non real-time plug transfer information block 200, through address 0007$_{16}$ in this case. For the non real-time plug transfer information block 200 illustrated in FIG. 4, the primary_fields_length field is two. The enable field is set to indicate whether or not the plug is configured for non real-time A/V content transmission/reception. The enable field, when clear, indicates that the plug is configured for real-time A/V content transmission/reception. The bandwidth field indicates the nominal rate of the data stream transfer. The value in the bandwidth field is defined in terms of reserved bandwidth on the IEEE 1394-2000 serial bus as reserved by the Isochronous Resource Manager. Logically, the value of the bandwidth field defines the speed of the data transmission. For example, one-half real-time speed, two times real-time speed, three times real-time speed, etc.

Proper plug configuration using the non real-time plug transfer information block is necessary to prepare the transmitting and receiving AV/C devices for non real-time data transfer. Next, the A/V stream content is configured for transmission in non real-time.

Figure 5:
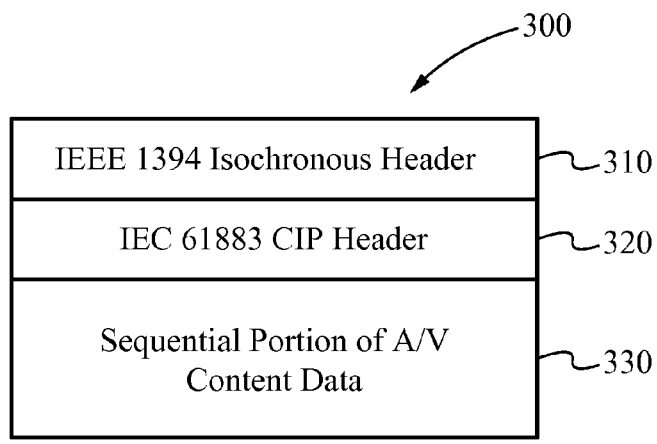
FIG. 5 illustrates an IEEE 1394-2000 isochronous data packet.

At a transmitting device, the data transmission method of the present invention first prepares the A/V stream content as if it is to be transmitted in real-time. The AV/C stream content is prepared for real-time transmission according to conventional methodology. An 1394-2000 isochronous data packet is characterized by a header portion and a data portion. The header portion is created by first adding an IEEE 1394-2000 isochronous header according to the IEEE 1394-2000 standard. Second, an IEC 61883 CIP header according to the IEC 61883 standard is added to the header portion. The data portion is created by parsing the A/V stream content in sequential portions and adding a portion into the data portion according to IEC 61883 standards. As a result, IEEE 1394-2000 isochronous data packets are created for sequential portions of the A/V stream content. FIG. 5 illustrates an IEEE 1394-2000 isochronous data packet 300 formatted for real-time transmission. The header portion of the isochronous packet 300 includes an IEEE 1394-2000 isochronous header 310 and an IEC 61883 CIP header 320. The data portion includes a sequential portion of the A/V content data 330.

The isochronous header 310 includes a data_length field which is set to a value that conforms to the bandwidth allocated in the output plug configuration information block. The data_length field indicates the amount of data included in the IEEE 1394-2000 isochronous data packet. The CIP header 320 includes a fmt field which is set to a value that indicates the format of the portion of A/V stream content in the data portion of the isochronous packet 300. The value in the fmt field of a real-time IEEE 1394-2000 isochronous data packet indicates the format is in real-time.

According to the data transmission method of the present invention, the real-time IEEE 1394-2000 isochronous data packet(s) are then encapsulated within an isochronous header and CIP header identified for non real-time A/V content, thereby forming a non real-time isochronous data packet. In other words, the data transmission method encapsulates, or re-wraps, existing packetized real-time A/V content by adding another IEEE 1394-2000 isochronous header and IEC 61883 CIP header. In the added isochronous header, the data_length field defines the size of the re-wrapped, non real-time packet. In the added CIP header, the fmt field indicates non real-time A/V content. The number of real-time IEEE 1394-2000 isochronous data packets which are encapsulated within each non real-time isochronous data packet is determined by the speed of the non real-time transmission. For example, if the non real-time transmission is twice the real-time speed, two real-time IEEE 1394-2000 isochronous data packets are encapsulated within the non real-time packet.

Figure 6:
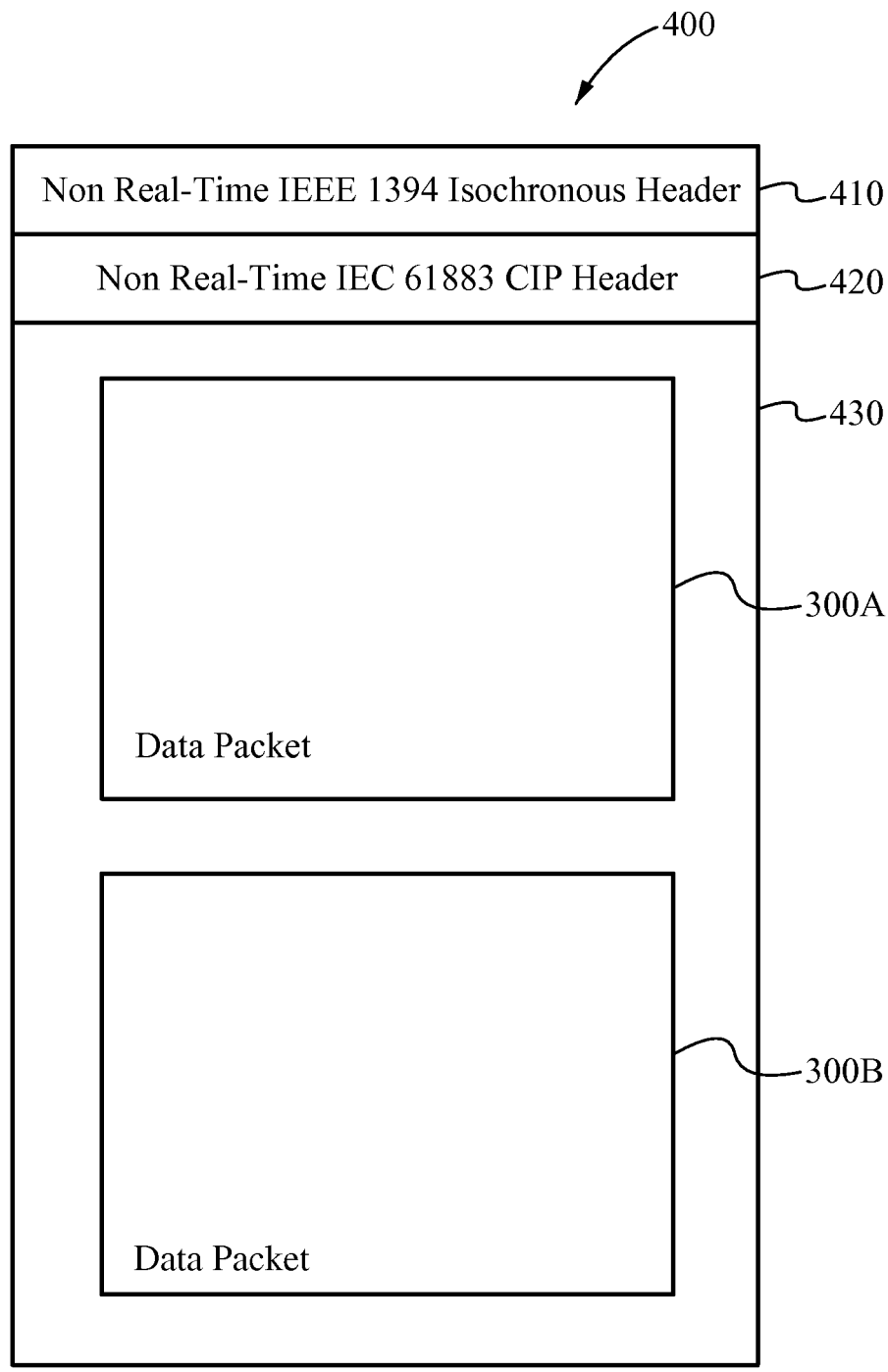
FIG. 6 illustrates an exemplary non real-time 1394-2000 isochronous data packet transmitted at twice the real-time transmission speed.

FIG. 6 illustrates a non real-time IEEE 1394-2000 isochronous data packet transmitted at twice the real-time transmission speed. A non real-time IEEE 1394-2000 isochronous data packet 400 includes a non real-time IEEE 1394-2000 isochronous header 410, a non real-time IEC 61883 CIP header 420, and an encapsulated data portion 430. The encapsulated data portion 430 includes two real-time IEEE 1394-2000 isochronous data packets 300A and 300B. The real-time data packets 300A and 300B are each formatted the same as IEEE 1394-2000 isochronous data packet 300 and each represent sequential portions of the A/V stream content. The fmt field in each of the CIP headers of the real-time data packets 300A and 300B is set to a value indicating real-time transmission. However, the fmt field in the CIP header 420 is set to a value indicating non real-time transmission. The data_length field in each of the isochronous headers of the real-time data packets 300A and 300B is set to a value corresponding to the bandwidth necessary for real-time transmission. The value of the data_length field of the non real-time isochronous header 410 corresponds to the allocated bandwidth for the non real-time transmission. The data_length field of the non real-time isochronous header 410 is equal to the sum of the size of each of the real-time data packets 300A and 300B including both of their isochronous headers, CIP headers, and encapsulated data. Instead of a single real-time isochronous data packet being transmitted each cycle, a non real-time isochronous data packet containing two real-time isochronous data packets is transmitted each cycle.

Figure 7:
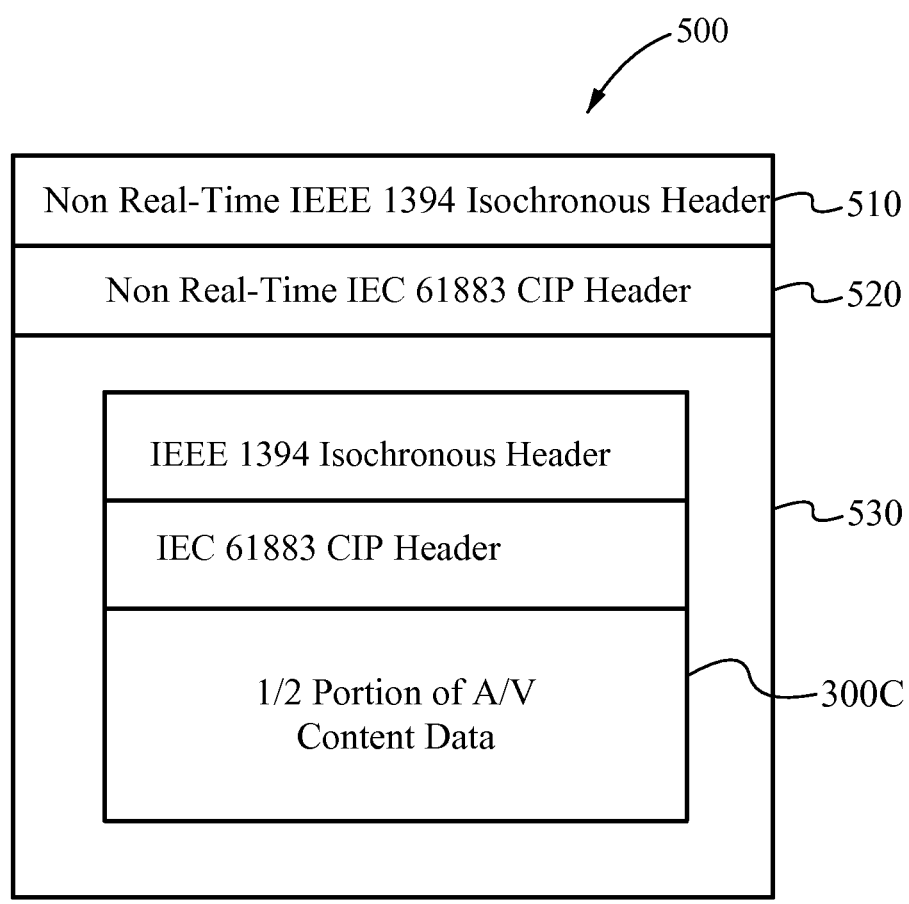
FIG. 7 illustrates an exemplary non real-time 1394-2000 isochronous data packet transmitted at one-half the real-time transmission speed.

FIG. 7 illustrates a non real-time IEEE 1394-2000 isochronous data packet transmitted at one-half the real-time transmission speed. A non real-time IEEE 1394-2000 isochronous data packet 500 includes a non real-time IEEE 1394-2000 isochronous header 510, a non real-time IEC 61883 CIP header 520, and an encapsulated data portion 530. The encapsulated data portion 530 includes one real-time IEEE 1394-2000 isochronous data packet 300C. The real-time IEEE 1394-2000 isochronous data packet 300C is formatted the same as IEEE 1394-2000 isochronous data packet 300, however the data portion contains only one-half the data of the real-time IEEE 1394-2000 isochronous data packet 300. A controller on a transmitting device divides the data portion of the real-time IEEE 1394-2000 isochronous data packet 300 in half. Preferably, the controller counts quadlets within the data portion and divides the total number of quadlets in two. The isochronous header and the CIP header of the real-time data packet 300C remain unchanged from the real-time isochronous data packet 300. The fmt field in the CIP header of the real-time data packet 300C indicates real-time format. However, the fmt field in the non real-time CIP header 520 indicates non real-time format. The data_length of the real-time isochronous data packet 300C indicates the amount of data corresponding to the bandwidth necessary for real-time transmission. Since the data portion of the real-time data packet 300C only contains half the amount of data as the original real-time IEEE 1394-2000 isochronous data packet 300C and the isochronous header of the real-time data packet 300C is unchanged, the data_length in the isochronous header of the real-time data packet 300C is twice as large as the actual data contained in the data portion of the real-time data packet 300C. The data_length field of the non real-time IEEE 1394-2000 isochronous header 510 is the amount of data included in the encapsulated data 530 of the non real-time IEEE 1394-2000 isochronous data packet 500. Therefore, the data_length field of the non real-time IEEE 1394-2000 isochronous header 510 is one-half the value of the data_length field in the real-time data packet 300C. Instead of a single real-time isochronous data packet being transmitted every cycle, a non real-time IEEE 1394-2000 isochronous data packet containing essentially one-half of a real-time isochronous data packet is transmitted each cycle.

At a receiving device, the non real-time IEEE 1394-2000 isochronous data packets are received and the non real-time isochronous and CIP headers are stripped off, thereby exposing the real-time IEEE 1394-2000 isochronous data packets containing the packetized A/V content stream. The fiat field in the non real-time CIP header is read to determine that the received packet is in a non real-time format. The non real-time format indicates to the receiving device that the data portion of the received non real-time isochronous data packet includes real-time isochronous data packets. The non real-time format also signals the receiving device to search the data portion and read the header of a real-time isochronous data packet included within the data portion. The data_length field of each real-time isochronous header is read to determine the size of each real-time packet. The data_length field of the non real-time isochronous header is read to determine the size of the data portion of the received non real-time packet. The data_length of the non real-time data packet is compared to the data_length of the real-time data packet. If the non real-time data packet is delivered at a speed greater than real-time, the data_length of the non real-time data packet is greater than the data_length of the real-time packet. For a speed greater than real-time, there are multiple real-time data packets included in the data portion of the non real-time data packet. Conventional real-time isochronous data packet processing is used to convert the multiple real-time IEEE 1394-2000 isochronous data packets to the A/V content stream, which is then transferred to storage.

In the case where the non real-time transmission speed is two times the rate of the real-time transmission speed, a stream of data packets similar to the non real-time isochronous data packet 400 are received by the receiving device. The receiving device strips off the non real-time isochronous header 410 and the non real-time CIP header 420. The fiat field in the non real-time CIP header 420 is read to determine that the received non real-time isochronous data packet 400 is in a non real-time format. This indicates to the receiving device that the encapsulated data 430 includes real-time data packets. To determine if a partial real-time data packet or multiple real-time data packets are included in the encapsulated data 430, the data_length field of the non real-time isochronous header 410 is read, and the real-time isochronous header of the real-time data packet 300A is searched for in the encapsulated data 430. Once the real-time isochronous header is located, the data_length of the real-time isochronous data packet 300A is read. The data_length of the non real-time isochronous data packets 400 is compared to the data_length of the real-time isochronous data packet 300A. It is determined that the data_length of the non real-time isochronous data packets 400 is greater than and approximately twice the size of the data_length of the real-time isochronous data packet 300A. This comparison indicates to the receiving device that there are multiple real-time data packets included in the encapsulated data 430. The multiple real-time data packets, in this case real-time isochronous data packets 300A and 300B, are then processed as conventional real-time IEEE 1394-2000 isochronous data packets.

If the non real-time packet is delivered at a speed less than real-time, the data_length of the non real-time data packet is less than the data_length of the real-time packet. For a speed less than real-time, there is a single real-time packet included in the data portion of the non real-time data packet where the single real-time packet includes a portion of the data of an originally packetized real-time IEEE 1394-2000 isochronous data packet. In this case, the receiving device expects to receive the remaining portion of the originally packetized real-time IEEE 1394-2000 isochronous data packet in subsequent cycles. The real-time data packet is not processed until data corresponding to a complete originally packetized real-time IEEE 1394-2000 isochronous data packet is received. Receiving the complete real-time data packet can take two or more cycles depending on the non real-time speed. Once a complete real-time IEEE 1394-2000 isochronous data packet is received, conventional real-time isochronous data packet processing is used to convert the multiple real-time IEEE 1394-2000 isochronous data packets to the A/V content stream, which is then transferred to storage.

In the case where the non real-time transmission speed is one-half the rate of the real-time transmission speed, a stream of data packets similar to the non real-time isochronous data packet 500 are received by the receiving device. The receiving device strips off the non real-time isochronous header 510 and the non real-time CIP header 520. The fmt field in the non real-time CIP header 520 is read to determine that the received non real-time isochronous data packet 500 is in a non real-time format. This indicates to the receiving device that the encapsulated data 530 includes real-time data packets. To determine if a partial real-time data packet or multiple real-time data packets are included in the encapsulated data 530, the data_length field of the non real-time isochronous header 510 is read, and the real-time isochronous header of the real-time data packet 300C is searched for in the encapsulated data 530. Once the real-time isochronous header is located, the data_length of the real-time isochronous data packet 300C is read. The data_length of the non real-time isochronous data packets 500 is compared to the data_length of the real-time isochronous data packet 300C. It is determined that the data_length of the non real-time isochronous data packets 500 is less than and approximately one-half the size of the data_length of the real-time isochronous data packet 300C. This comparison indicates to the receiving device that there is a single real-time data packet included in the encapsulated data 430 and that the real-time packet includes only half the necessary data. Since only half of the necessary data is available, the receiving device does not process the real-time isochronous data packet 300C until the next cycle when the other half of the necessary data is received. Once the other half of the necessary data is received, it is added to the real-time isochronous data packet 300C. The real-time isochronous data packet 300C is then processed as a conventional real-time IEEE 1394-2000 isochronous data packet.

A method of flow control and retransmission is applied to the transmission of the stream of non real-time isochronous data packets. An isochronous back channel is configured that transmits an isochronous back channel packet from the receiving device to the transmitting device. Flow control and retransmission instructions are included within the isochronous back channel packet. The receiving device creates and outputs the isochronous back channel packet with control instructions for the transmitting device to perform the desired flow control and retransmission functionality. As is the case with transmitting isochronous data packets in non real-time, two problems exist in providing retransmission and flow control capabilities related to the non real-time isochronous data packet transmission. First, in addition to configuring the transmitting device plug and receiving device plug for the non real-time isochronous data packet transmission, a receiving device plug and transmitting device plug need to be configured to support the isochronous back channel for transmission of the isochronous back channel packet. Second, the isochronous back channel packet to be transmitted over the isochronous back channel needs to be defined for indicating retransmission and flow control.

Figures 8, 9:
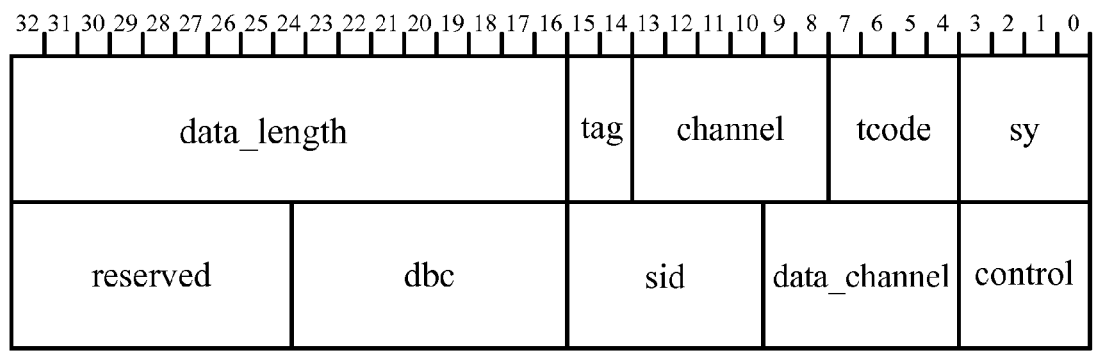
FIG. 8 illustrates a back channel flow control information block.
FIG. 9 illustrates an isochronous back channel packet format according to the preferred embodiment of the present invention.

The data transmission method of the present invention solves the first problem by creating a new information block which is preferably nested within the non real-time plug transfer information block. It should be clear to those skilled in the art that the exact hierarchical location of this new information block can vary as long as the new information block properly configures a receiving device plug and a transmitting device plug for the isochronous back channel. The new information block embedded within the non real-time plug transfer information block is referred to as a back channel flow control information block. The back channel flow control information block according to the present invention is illustrated in FIG. 8. Similar to the non real-time plug transfer information block, a back channel flow control information block 600 includes a compound_length field, an info_block_type field, and a primary_fields_length field. The compound_length field specifies the number of bytes for the remainder of the back channel flow control information block 600, which is all fields that follow the compound_length field. The info_block_type field is set to a code indicating that the plug defined by this information block describes an isochronous back channel mechanism. The primary_fields_length field specifies the number of bytes for the remaining back channel flow control information block 600, through address $0006_{16}$ in this case. For the back channel flow control information block 600 illustrated in FIG. 8, the primary_fields_field is one. Additionally, the back channel flow control information block 600 includes an isochronous_channel_number field set to indicate which channel is used by the isochronous back channel. The back channel flow control information block 600 configures a plug on each of the transmitting device and the receiving device to support the isochronous back channel. The plugs configured for the transmission of the non real-time isochronous data packets are different than the plugs configured for the transmission of the isochronous back channel packets over the isochronous back channel. Also, the isochronous back channel is different than the data transmission channel. If the back channel flow control information block 600 is not included, then a device does not support retransmission and flow control of the non real-time isochronous data packets.

The second problem to providing retransmission and flow control capabilities related to the non real-time isochronous data packet transmission is solved by defining isochronous back channel packets used for flow control and error retries for the non real-time transmission/reception of isochronous data packets. When the receiving device determines that retransmission or flow control of the received stream of non real-time isochronous data packets is necessary, the isochronous back channel packet provides the flow control and retransmission information from the receiving device to the transmitting device. FIG. 9 illustrates an isochronous back channel packet format according to the preferred embodiment of the present invention. The isochronous back channel packet includes two quadlets of information. The first quadlet is the isochronous header and the second quadlet is the data payload. The isochronous header includes a data_length field, a tag field, a channel field, a tcode field, and a sy field. The data_length field is set to the size in bytes of the isochronous back channel packet, not including the isochronous header, which in this case is 4 bytes (one quadlet). The tag field is set to a value that defines the format of the data payload. In this case, the tag field equals zero, which indicates that the data payload is unformatted. The channel field specifies the isochronous data channel for the packet and is set in the back channel flow control information block. The tcode field specifies the packet format and the type of transaction that shall be performed, and in this case is set for isochronous data. The sy field is an application-specific control field, and in this case is set to zero.

The data payload includes a reserved field, a dbc field, an sid field, a data_channel field, and a control field. A control field value of 'zero' is an indication to resume transmission of the non real-time isochronous data packets. A control field value of 'one' is an indication to stop (hold off) transmission of the non real-time isochronous data packets. A control field value of 'two' is an indication that an error in transmission has occurred and retransmission is required. Other values can be defined for the control field to indicate various other control instructions, for example speed up or slow down the transmission rate of the non real-time isochronous data packets. The data_channel field contains the isochronous channel of the non real-time isochronous data packet stream to which the control instruction indicated in the control field is to be applied. The sid field is the IEEE 1394-2000 source Node ID of the node generating this isochronous back channel packet. In other words, the sid field identifies the sender of isochronous back channel packet. Within the CIP header of each transmitted non real-time isochronous data packet is a dbc field that identifies that specific isochronous data packet. The dbc field acts as a data block count of the non real-time isochronous data packet stream, The dbc field within the data payload of the isochronous back channel packet contains the dbc of the non real-time isochronous data packet that requires retransmission (control field=2) or the packet to resume transmission (control field=0). The transmitting device resets/resumes transmission of the non real-time isochronous data packets beginning at the packet identified by the dbc value indicated in the isochronous back channel packet.

Figure 10:
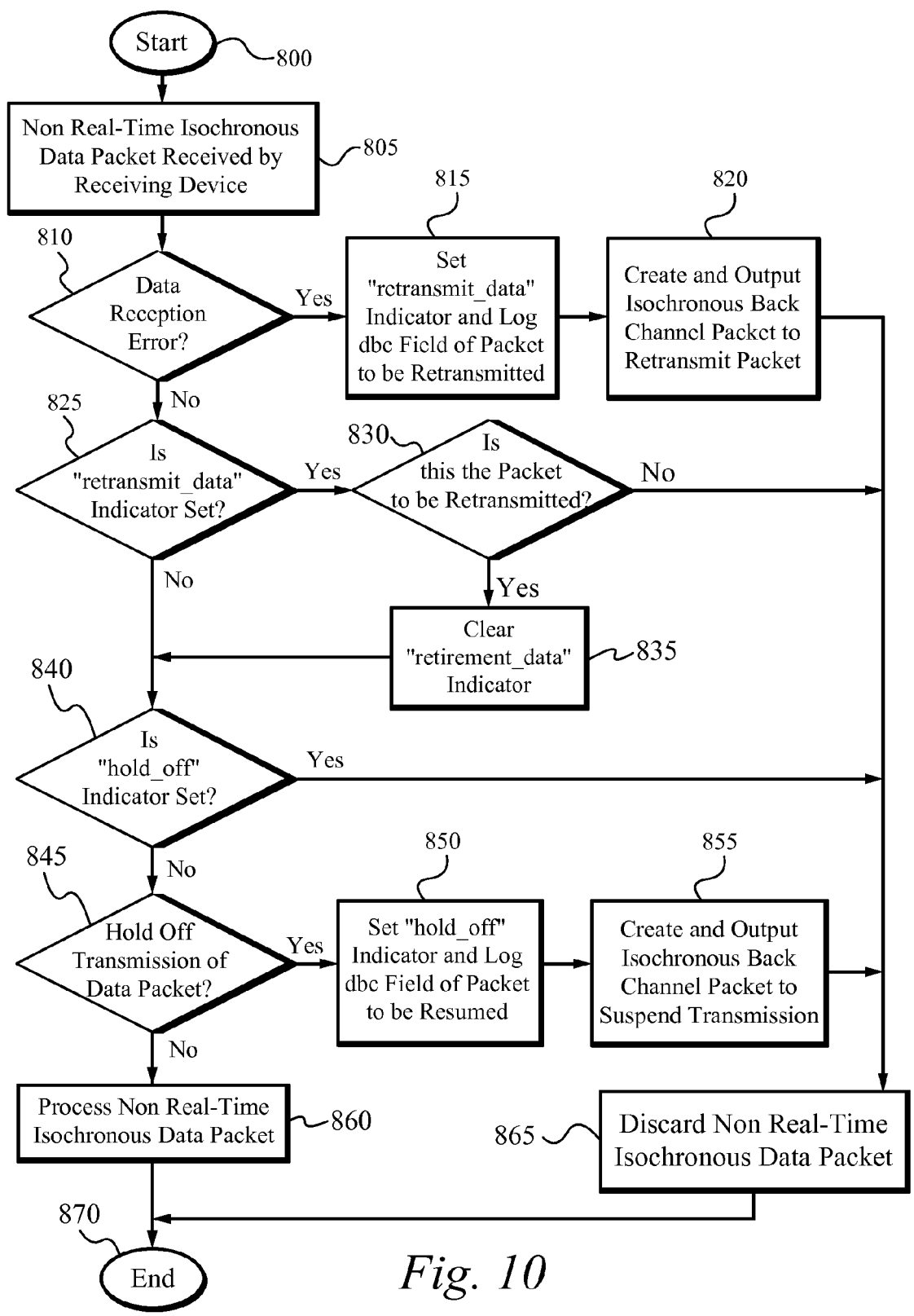
FIG. 10 illustrates a flowchart showing the preferred process of implementing flow control and retransmission on data reception at the receiving device.

FIG. 10 illustrates a flowchart showing the preferred process of implementing flow control and retransmission on data reception at the receiving device. The flow control and retransmission process begins at the step 800. At the step 805, the non real-time isochronous data packet is received by the receiving device. At the step 810, it is determined if there is an error in the received packet. Any conventional error checking method can be used. If at the step 810 it is determined that there is an error in the received packet, then at the step 815 a retransmit_data indicator is set and the dbc field of the received packet to be retransmitted is logged. At the step 820, an isochronous back channel packet is created and output to the transmitting device, where the transmitting device is the source of the received packet to be retransmitted. The isochronous back channel packet includes a dbc field of the received packet to be retransmitted, a data_channel on which the received packet was transmitted, and a control value of '2' to indicate that an error has occurred and retransmission is required by the transmitting device. At the step 865, the non real-time isochronous data packet is discarded since the packet contains an error and is to be retransmitted.

If it is determined at the step 810 that there is not an error in the received packet, then at the step 825 it is determined if the retransmit_data indicator is set. The retransmit_data indicator remains set if an isochronous back channel packet for retransmission has been transmitted to the transmitting device and the retransmission has yet to occur. The retransmit_data indicator is checked in case another packet is received subsequent to a retransmit request. Since there can be a delay between the creation and output of the isochronous back channel packet and resulting action performed by the transmitting device, it is possible that one or more packets can be transmitted by the transmitting device before the transmitting device receives and acts on the control instructions contained within the isochronous back channel packet. If it is determined at the step 825 that the retransmit_data indicator is set, then at the step 830 it is determined if the current received packet is the packet to be retransmitted. If it is determined at the step 830 that the current received packet is not the packet to be retransmitted, then at the step 865 the current received packet is discarded. If the current received packet is not the packet to be retransmitted, then the current received packet must be a packet transmitted subsequent to the packet to be retransmitted but was transmitted prior to the receiving device receiving the isochronous back channel packet. If it is determined at the step 830 that the current received packet is the packet to be retransmitted, than at the step 835 the retransmit_data indicator is cleared.

If it is determined at the step 825 that the retransmit_data indicator is not set or after the retransmit_data indicator has been cleared at the step 835, it is determined at the step 840 if a hold_off indicator is set. The hold_off indicator is set if an isochronous back channel packet for stopping transmission of the non real-time isochronous data packets has been sent to the transmitting device and the transmission has yet to stopped. The hold_off indicator is checked in case another packet is received subsequent to a stop transmission request. If it is determined at the step 840 that the hold_off indicator is set, then the current received packet is discarded at the step 865. If the current received packet was received while the hold_off indicator is set, then the current received packet was transmitted subsequent to the receiving device sending an isochronous back channel packet to stop transmission, but before the transmitting device received and acted upon the isochronous back channel packet. If it is determined at the step 840 that the hold_off indicator is not set, then it is determined at the step 845 if the transmission of the non real-time isochronous data packets is to be stopped. Preferably, transmission is stopped if the receiving device can not process the received packets at a rate sufficient to match the rate at which the packets are received by the receiving device. In this case, transmission is stopped in order to avoid an overflow condition.

If it is determined at the step 845 that the transmission of the non real-time isochronous data packets is to be stopped, then at the step 850 the hold_off indicator is set and the dbc field of the packet to resume transmission is logged. When transmission is resumed, the starting packet of the resumed transmission is the logged packet to resume transmission. The logged packet to resume transmission is the current received packet. After the hold_off indicator is set at the step 850, at the step 855 an isochronous back channel packet is created and output to the transmitting device, where the transmitting device is the source of the stream of non real-time isochronous data packets to be stopped: The isochronous back channel packet includes a dbc field of the logged packet to resume transmission, a data_channel field indicating the channel of the stream of non real-time isochronous data packets that is to be stopped, and a control value of '1' to indicate that the transmission of the stream of non real-time isochronous data packets specified in the data_channel field is to be stopped. At the step 865, the non real-time isochronous data packet is discarded since the received packet will be transmitted once transmission is resumed. If it is determined at the step 845 that the transmission of the non real-time isochronous data packets is not to be stopped, then at the step 860 the received packet is processed according to the aforementioned process related to non real-time isochronous data packets. After the received packet is processed at the step 860 or after the received packet is discarded at the step 865, the flow control and retransmission process ends at the step 870.

Figure 11:
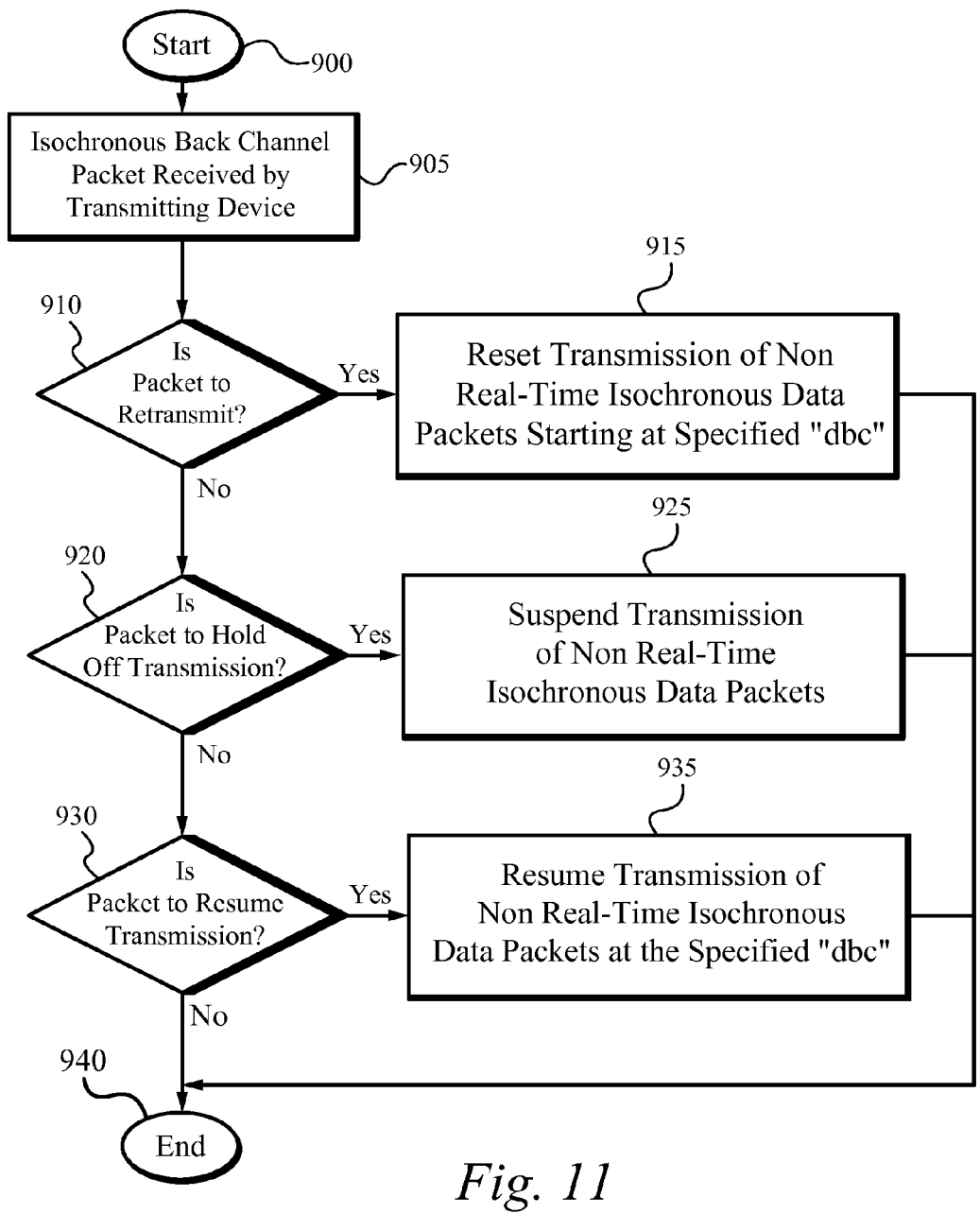
FIG. 11 illustrates a flowchart showing the preferred process of implementing flow control and retransmission on data transmission at the transmitting device.

FIG. 11 illustrates a flowchart showing the preferred process of implementing flow control and retransmission on data transmission at the transmitting device. The flow control and retransmission process begins at the step 900. At the step 905, the isochronous back channel packet is received by the transmitting device from the receiving device over the isochronous back channel. The control field of the isochronous back channel packet is read to determine if the transmitting device is to retransmit, hold off transmission, or resume transmission. At the step 910 it is determined if the control field specifies retransmission. If at the step 910 it is determined that the control field indicates retransmission, then at the step 915 the transmission of the stream of non real-time isochronous data packets corresponding to the channel indicated in the data_channel field of the isochronous back channel packet is reset to start at the packet specified in the dbc field of the isochronous back channel packet. If it is determined at the step 910 that the control field does not indicate retransmission, then at the step 920 it is determined if the control field is an indication to hold off transmission. If it is determined at the step 920 that the control field is an indication to hold off transmission, then at the step 925 the transmission of the stream of non real-time isochronous data packets corresponding to the channel indicated in the data_channel field of the isochronous back channel packet is stopped. If it is determined at the step 920 that the control field is not an indication to hold off transmission, then at the step 930 it is determined if the control field is an indication to resume transmission. If it is determined at the step 930 that the control field is an indication to resume transmission, then at the step 935 the transmission of the stream of non real-time isochronous data packets corresponding to the channel indicated in the data_channel field of the isochronous back channel packet starts at the packet specified in the dbc field of the isochronous back channel packet. If it is determined at the step 930 that the control field is not an indication to resume transmission, or after the step 915, or after the step 925, or after the step 935, then the flow control and retransmission process ends at the step 940.

Figure 12:
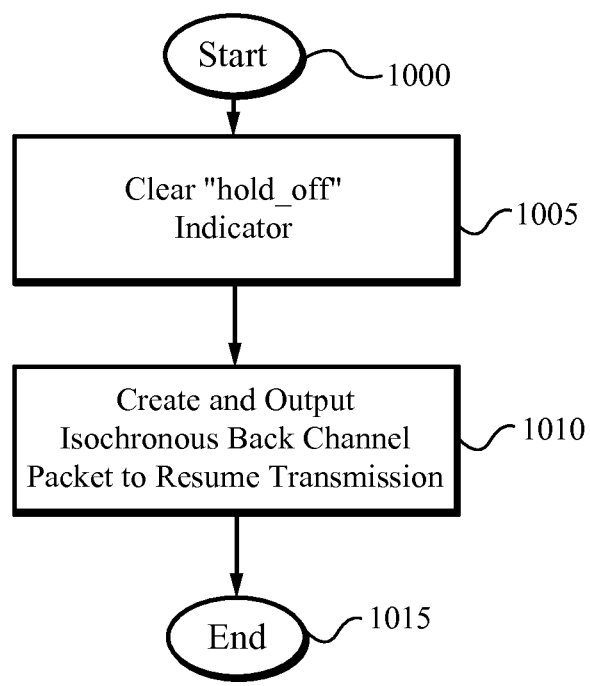
FIG. 12 illustrates a flowchart showing the preferred process of flow control implemented by the receiving device to resume transmission.

FIG. 12 illustrates a flowchart showing the preferred process of flow control implemented by the receiving device to resume transmission. The resume transmission process begins at the step 1000 once it is determined that the receiving device is capable of receiving the stream of non real-time isochronous data packets. At the step 1005, the hold_off indicator is cleared. At the step 1010, an isochronous back channel packet is created and output to the transmitting device, where the transmitting device is the source of the stream of non real-time isochronous data packets to be resumed. The isochronous back channel packet includes a dbc field of the logged packet to resume transmission, a data_channel field that indicates the channel on which the stream of non real-time isochronous data packets is to be resumed, and a control value of '0' to indicate that the transmission of the stream of non real-time isochronous data packets specified in the data_channel field is to be resumed. The resume transmission process ends at the step 1015.

In order to perform the flow control and retransmission functionality of the present invention, the transmitting device preferably includes a buffer for temporarily storing the most recently transmitted non real-time isochronous data packets. Preferably, the buffer can store 1-2 non real-time isochronous data packets. It should be clear to those skilled in the art that the buffer can store more than two non real-time isochronous data packets, or that the buffer is replaced by any other conventional means of storing the transmitted non real-time isochronous data packets. It is necessary that the packetized non real-time isochronous data packets are stored in the buffer since the flow control and retransmission functionality requires the use of the dbc field contained in the CIP header. The CIP header only exists after the A/V content stream is packetized into non real-time isochronous data packets.

Although the present invention has been described as preferably transmitting isochronous back channel packets over the isochronous back channel, the data transmission method of the present invention can also transmit properly formatted asynchronous back channel packets over the isochronous back channel or over an asynchronous path. However, formatting back channel packets as asynchronous back channel packets is not preferred. It is preferred that isochronous back channel packets are used because delivery of isochronous data packets is guaranteed. Asynchronous back channel packet delivery is not guaranteed. When using asynchronous back channel packets, reception of the asynchronous back channel packet may not be received in sufficient time by the transmitting device to prevent the non real-time packet specified by the dbc field of the received asynchronous back channel packet from being overwritten in the buffer.

The present invention enables flow control and retransmission functionality to be applied to data transmitted as isochronous data packets. Flow control and retransmission functionality has conventionally been limited to data transmitted as asynchronous data packets. The present invention eliminates the need to have to choose between data security and transmission reliability. By transmitting data as isochronous data packets, copy protection is employed while the present invention utilizes flow control and retransmission functionality. As a result of the present invention, data security and transmission reliability are both provided during isochronous data packet transmission.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-2000 serial bus structure, the present invention could also be implemented on any other appropriate system bus structure. Additionally, it will also be apparent that while the preferred embodiment of the present invention transmits the non real-time isochronous data packets over an isochronous channel, the non real-time isochronous data packets can also be transmitted over asynchronous streams.

We claim:

1. A method of performing retransmission and flow control comprising:
    a. configuring a back channel between a transmitting device and a receiving device for providing retransmission and flow control information from the receiving device to the transmitting device related to a stream of isochronous data packets transmitted from the transmitting device to the receiving device;
    b. monitoring the stream of isochronous data packets received at the receiving device for necessary retransmission or flow control;
    c. configuring a back channel packet for indicating a retransmission or flow control function to perform;
    d. transmitting the back channel packet from the receiving device to the transmitting device over the back channel; and
    e. resetting transmission to re-start from a specified packet, such that the specified packet and packets after the specified packet within the stream of isochronous data packets are transmitted.

2. The method according to claim 1 wherein configuring the back channel includes configuring a transmitting plug on the receiving device for transmitting the back channel packet over the back channel and configuring a receiving plug on the transmitting device for receiving the back channel packet over the back channel.

3. The method according to claim 1 wherein the stream of isochronous data packets is transmitted in non real-time.

4. The method according to claim 1 wherein the back channel packet includes a control instruction that instructs the transmitting device to reset transmission of the stream of isochronous data packets starting from a specified packet within the stream of isochronous data packets.

5. The method according to claim 4 wherein the back channel packet includes a control field that contains a value corresponding to the control instruction.

6. The method according to claim 1 wherein the back channel is an isochronous channel.

7. The method according to claim 1 wherein the back channel packet includes a control instruction that instructs the transmitting device to stop transmitting the stream of isochronous data packets.

8. The method according to claim 1 wherein the stream of isochronous data packets includes audio/visual content data.

9. The method according to claim 1 wherein the back channel packet is an isochronous data packet.

10. The method according to claim 1 wherein the back channel packet is an asynchronous data packet.

11. A method of configuring a plug to support an isochronous back channel comprising:
    a. embedding a back channel flow control information block within a plug configuration information block;
    b. defining a back channel information type within the back channel flow control information block, wherein the back channel information type indicates an isochronous back channel control mechanism for providing a flow control and retransmission control instruction, wherein the control instruction instructs a transmitting device to reset transmission of the stream of isochronous data packets starting from a specified packet within the stream of isochronous data packets, such that the specified packet and packets after the specified packet within the stream of isochronous data packets are transmitted; and
    c. setting an isochronous channel number field within the back channel flow control information block to indicate the isochronous channel used to send an isochronous back channel packet, wherein the isochronous back channel packet includes the control instruction which is used to regulate a transmission of a stream of isochronous data packets.

12. A method of performing retransmission and flow control comprising:
    a. configuring an isochronous channel between a transmitting device and a receiving device as an isochronous back channel for providing retransmission and flow control information from the receiving device to the transmitting device related to a stream of isochronous data packets transmitted from the transmitting device to the receiving device;
    b. monitoring the stream of isochronous data packets received at the receiving device for necessary retransmission or flow control;
    c. configuring an isochronous back channel packet for indicating a retransmission or flow control function to perform; and
    d. transmitting the isochronous back channel packet from the receiving device to the transmitting device over the isochronous back channel, wherein the back channel packet includes a control instruction that instructs the transmitting device to reset transmission of the stream of isochronous data packets starting from a specified packet within the stream of isochronous data packets, such that the specified packet and packets after the specified packet within the stream of isochronous data packets are transmitted.

13. The method according to claim 12 wherein configuring the isochronous channel includes configuring a transmitting plug on the receiving device for transmitting the isochronous back channel packet over the isochronous back channel and configuring a receiving plug on the transmitting device for receiving the isochronous back channel packet over the isochronous back channel.

14. The method according to claim 12 wherein the stream of isochronous data packets includes audio/visual content data.

15. The method according to claim 12 wherein the isochronous back channel packet includes a control instruction that instructs the transmitting device to reset transmission of the stream of isochronous data packets starting from a specified packet within the stream of isochronous data packets.

16. The method according to claim 15 wherein the isochronous back channel packet includes a dbc field that identifies the specific packet within the stream of isochronous data packets.

17. The method according to claim 15 wherein the isochronous back channel packet includes a control field that contains a value corresponding to the control instruction.

18. The method according to claim 12 wherein the isochronous back channel packet includes a control instruction that instructs the transmitting device to stop transmitting the stream of isochronous data packets.

19. A method of transmitting flow control and retransmission information comprising:
   a. configuring a transmitting plug on a receiving device for transmitting an isochronous back channel packet over an isochronous channel via the transmitting plug to a transmitting device;
   b. determining flow control and retransmission information based on the status of a received isochronous data packet at the receiving device, wherein the received isochronous data packet is one of a stream of isochronous data packets transmitted from the transmitting device to the receiving device;
   c. packetizing flow control and retransmission information within the isochronous back channel packet; and
   d. transmitting the isochronous back channel packet from the receiving device over the isochronous back channel via the transmitting plug, wherein the back channel packet includes a control instruction that instructs the transmitting device to reset transmission of the stream of isochronous data packets starting from a specified packet within the stream of isochronous data packets, such that the specified packet and packets after the specified packet within the stream of isochronous data packets are transmitted.

20. The method according to claim 19 wherein the status of the received isochronous data packet indicates that the receiving device is not capable of receiving the stream of isochronous data packets and instructs the transmitting device to stop transmitting the stream of isochronous data packets.

21. The method according to claim 19 wherein the status of the received isochronous data packet indicates that the receiving device is capable of resuming reception of the stream of isochronous data packets and instructs the transmitting device to restart transmission of the stream of isochronous data packets starting from a specified packet within the stream of isochronous data packets.

22. The method according to claim 19 wherein the status of the received isochronous data packet indicates a packet transmission error and instructs the transmitting device to reset transmission of the stream of isochronous data packets starting from a specified packet within the stream of isochronous data packets.

23. A method of receiving flow control and retransmission information comprising:
   a. configuring a receiving plug on a transmitting device for receiving an isochronous back channel packet from a receiving device, wherein the isochronous back channel packet is received over an isochronous channel via the receiving plug;
   b. receiving the isochronous back channel packet via the receiving plug;
   c. reading flow control and retransmission information included within the isochronous back channel packet wherein the flow control and retransmission information relates to a stream of isochronous data packets transmitted from the transmitting device to the receiving device and provides a control instruction to the transmitting device to regulate transmission of the stream of isochronous data packets, wherein the control instruction instructs the transmitting device to reset transmission of the stream of isochronous data packets starting from a specified packet within the stream of isochronous data packets, such that the specified packet and packets after the specified packet within the stream of isochronous data packets are transmitted; and
   d. regulating transmission of the stream of isochronous data packets as determined by the control instruction.

24. The method according to claim 23 wherein the control instruction instructs the transmitting device to reset transmission of the stream of isochronous data packets starting from a specified packet within the stream of isochronous data packets.

25. The method according to claim 23 wherein the control instruction instructs the transmitting device to stop transmitting the stream of isochronous data packets.

26. The method according to claim 23 wherein the isochronous back channel packet includes identification of the stream of isochronous data packets, a control field that contains a value corresponding to the control instruction, and identification of a specific packet within the stream of isochronous data packets to which the control instruction is to be applied.

27. An apparatus for communicating flow control and retransmission information comprising:
   a. means for configuring a plug to communicate an isochronous back channel packet over an isochronous back channel, wherein a control field of the isochronous back channel packet is read to determine if a transmitting device is to retransmit, hold off transmission, or resume transmission;
   b. means for packetizing flow control and retransmission information within the isochronous back channel packet;
   c. means for communicating the isochronous back channel packet via the plug;
   d. means for extracting the flow control and retransmission information from the isochronous back channel packet; and
   e. means for controlling coupled to the means for configuring, the means for packetizing, the means for communicating, and the means for de-packetizing, wherein the means for controlling determines a control instruction and a stream of isochronous data packets to which the control instruction is applied from the flow control and retransmission information and applies the control instruction to the determined stream of isochronous data packets, wherein the control instruction instructs the transmitting device to reset transmission of the stream of isochronous data packets starting from a specified packet within the stream of isochronous data packets, such that the specified packet and packets after the specified packet within the stream of isochronous data packets are transmitted.

28. The apparatus according to claim 27 wherein the control instruction is an indication to reset transmission of the stream of isochronous data packets starting from a specified packet within the stream of isochronous data packets.

29. The apparatus according to claim 28 wherein the isochronous back channel packet includes a dbc field that identifies the specific packet within the stream of isochronous data packets.

30. The apparatus according to claim 28 wherein the isochronous back channel packet includes a control field that contains a value corresponding to the control instruction.

31. The apparatus according to claim 27 wherein the control instruction is an indication to stop transmitting the stream of isochronous data packets.

32. The apparatus according to claim 27 wherein the stream of isochronous data packets includes audio/visual content data.

33. The apparatus according to claim 27 wherein the transceiver circuit is configured to transmit isochronous data packets in non real-time via the plug.

34. The apparatus according to claim 27 wherein the transceiver circuit is configured to receive isochronous data packets in non real-time via the plug.

35. An apparatus for communicating flow control and retransmission information comprising:
  a. a configuring circuit to configure a plug to communicate an isochronous back channel packet over an isochronous back channel;
  b. a packetizing circuit to packetize flow control and retransmission information within the isochronous back channel packet;
  c. a transceiver circuit configured to communicate the isochronous back channel packet via the plug;
  d. a de-packetizing circuit to extract the flow control and retransmission information from the isochronous back channel packet; and
  e. a controller coupled to the configuring circuit, the packetizing circuit, the transceiver circuit, and the de-packetizing circuit to determine a control instruction and a stream of isochronous data packets to which the control instruction is applied from the flow control and retransmission information and apply the control instruction to the determined stream of isochronous data packets, wherein the control instruction instructs a transmitting device to reset transmission of the stream of isochronous data packets starting from a specified packet within the stream of isochronous data packets, such that the specified packet and packets after the specified packet within the stream of isochronous data packets are transmitted.

36. The apparatus according to claim 35 wherein the transceiver circuit is configured to receive isochronous data packets in non real-time via the plug.

37. The apparatus according to claim 35 wherein the control instruction is an indication to stop transmitting the stream of isochronous data packets.

38. The apparatus according to claim 35 wherein the stream of isochronous data packets includes audio/visual content data.

39. The apparatus according to claim 35 wherein the transceiver circuit is configured to transmit isochronous data packets in non real-time via the plug.

40. The apparatus according to claim 35 wherein the control instruction is an indication to reset transmission of the stream of isochronous data packets starting from a specified packet within the stream of isochronous data packets.

41. The apparatus according to claim 40 wherein the isochronous back channel packet includes a dbc field that identifies the specific packet within the stream of isochronous data packets.

42. The apparatus according to claim 40 wherein the isochronous back channel packet includes a control field that contains a value corresponding to the control instruction.

* * * * *